United States Patent Office 3,551,515
Patented Dec. 29, 1970

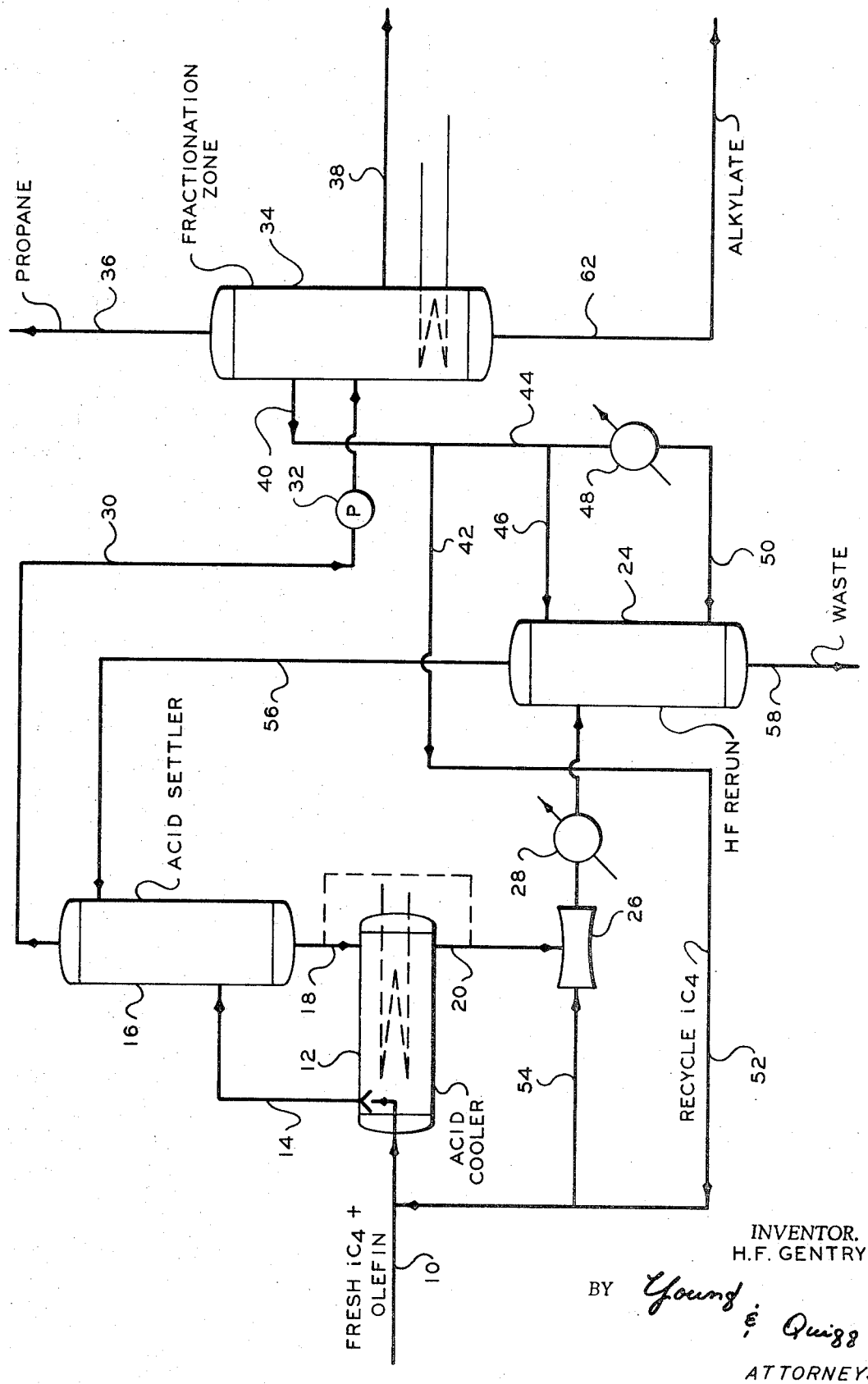

3,551,515
CHARGING SPENT ACID CATALYST
IN HF ALKYLATION
Harvey F. Gentry, Bartlesville, Okla., assignor to Phillips Petroleum Company, a corporation of Delaware
Filed Aug. 16, 1968, Ser. No. 753,283
Int. Cl. C07c 3/54
U.S. Cl. 260—683.48      4 Claims

ABSTRACT OF THE DISCLOSURE

An improved alkylation process is provided wherein in the HF alkylation catalyst regeneration system high pressure recycled isoparaffin actuates an eductor to charge HF catalyst to regeneration. The recycled isoparaffin plus recovered HF is returned to the reaction system.

BACKGROUND OF THE INVENTION

The catalytic alkylation of an olefin with an isoparaffin to form high-octane gasoline boiling range products is well known in the art. In a conventional alkylation process, an olefin feed comprising propylene and butylenes is passed with isobutane to an alkylation zone wherein the olefin and isobutane feed are contacted with liquid hydrofluoric acid, said hydrofluoric acid acting as an alkylation catalyst. The alkylation zone hydrocarbon effluent is separated from the acid catalysts and fractionally separated with the isobutane hydrocarbon fraction recycled to the alkylation zone.

While employed as an alkylation catalyst, the hydrofluoric acid becomes diluted due to its tendency to dissolve water entrained in the hydrocarbons being treated and/or water that is produced in the reaction mixture during the processing thereof. Moreover, the frequent occurrence of side reactions while the hydrocarbon is undergoing the reaction results in the formation of organic fluorides and acid-soluble oils, thereby diluting the hydrofluoric acid still further. It is desirous for reasons of economy that the hydrofluoric acid employed in the alkylation reaction be recovered and continuously recycled to the alkylation zone. It is required, therefore, that the dilute hydrofluoric acid separated from the alkylation zone hydrocarbon effluent be processed so that the diluents contained or combined therein can be removed from the hydrofluoric acid in order that the catalytic effectiveness of the hydrofluoric acid not be impaired.

HF alkylation processes have conventionally been comprised of independent process steps—(1) alkylation to include hydrocarbon effluent separation, and (2) acid rerun or recovery.

However, in providing for the acid rerun or recovery, much difficulty has been experienced due to the corrosive effect of the acid catalyst on the pumping units employed in transferring the liquid acid to the acid rerun unit.

THE INVENTION

Accordingly, an object of this invention is to provide an improved HF alkylation and acid rerun process and apparatus therefor.

Another object of this invention is to reduce the corrosion action of HF catalyst in the acid rerun process steps.

A still further object of the invention is to provide a means to reduce the heat requirements for the acid rerun preheating step.

Other aspects, objects and the several advantages of the invention will be readily apparent to those skilled in the art from the following description and the appended claims.

In accordance with the present invention I have discovered that by utilization of a portion of the recycle isoparaffin to actuate the passage of HF catalyst to the HF regeneration unit of an alkylation system there is avoided the corrosive effect of the HF catalyst on the system. In addition by providing a mixture of HF catalyst and recycle isoparaffin to the HF rerun or regeneration unit there is achieved a reduction in the heat requirements otherwise required of the regeneration unit preheater.

The process of this invention is applicable to the catalytic alkylation of a low-boiling olefin with a low-boiling isoparaffin, said low-boiling olefin having 3 to 5 carbon atoms per molecule and said low-boiling isoparaffin having 4 or 5 carbon atoms per molecule. The catalyst employed in the process of this invention comprises a hydrofluoric acid catalyst, said hydrofluoric acid catalyst to include those hydrofluoric acid catalysts containing boron fluoride.

The drawing is a schematic representation of one embodiment of the inventive process.

Referring to the drawing, the process will hereinafter be described as applied specifically to an olefin feed comprising propylene and butylenes and an alkylating agent comprising isobutane, although it is not intended that the invention should be limited thereto.

A liquid mixture of fresh isobutane and olefin, admixed in suitable proportions, is introduced through conduit 10, along with a large quantity of recycle isobutane to produce the desired high isobutane to olefin ratio, and passes upwardly through acid cooler 12 into the bottom of reactor 14 as a plurality of high velocity streams of small cross-section. Initially, the reactor and said acid cooler contain a quantity of liquid HF acid alkylation catalyst such that the level of catalyst extends a substantial distance up into the reactor 14. The liquid hydrocarbon material entering the reaction zone separates into small droplets which pass upwardly through the reactor. Acid catalyst passes upwardly through the reactor in co-current flow with the hydrocarbon feed. As the acid catalyst and hydrocarbon reactants come into contact, reaction between the olefin and isoparaffin occurs, with the formation of higher molecular weight materials of increased octane value. The reaction being exothermic, the temperature of the acid and reactants increases as the reaction mixture moves upwardly through the reactors. Within a very short period of time, usually on the order of 1 to 30 seconds, the alkylation reaction is completed, after which reaction effluent containing hydrocarbon product (alkylate), acid catalyst and unreacted isoparaffin passes from the reactor entering the settler surge vessel 16.

Following separation of the alkylation reaction effluent into the acid and hydrocarbon phases the lower acid phase passes from the settler 16 through conduit 18 to cooler 12. Acid passing through the cooler 12 is reduced in temperature sufficiently to remove heat picked up during the alkylation reaction. As necessary, acid is withdrawn from the system through conduit 20 for rerunning in HF rerun unit 24. Alternatively the portion of acid to be passed to the rerun unit can be passed directly to conduit 20 upstream of eductor 26 thereby by-passing cooling unit 12 and reducing the heating requirements of heater 24 as is otherwise required when removing the HF rerun stream from the acid cooling unit 12.

Conventional alkylation conditions are maintained within alkylation zone 14. With the feed stream comprising propylene and butylenes, the alkylating agent comprising isobutane and the catalyst comprising hydrofluoric acid, the temperature of the alkylation zone 14 is preferably maintained in the range of between about 85 to 105° F. with the pressure of alkylation zone 14 sufficient to maintain a liquid phase reaction. The volume measure of acid to hydrocarbon maintained in the alkylation zone 14 is preferably in the range from about 8:1 to 0.8:1. The isobutane to olefin ratio is maintained from about 4:1 to 20:1.

The hydrocarbon phase in separator 16 is passed by means of conduit 30 and pump 32 to fractionation zone 34 wherein it is separated into a propane and lighter fraction, including HF, withdrawn from fractionator 34 via conduit means 36, a normal butane fraction withdrawn via conduit 38, an isoparaffin (isobutane) fraction withdrawn via conduit 40 and an alkylate product fraction withdrawn via conduit 62. A portion of isoparaffin removed as liquid via conduit 40 is passed via conduit 44 to acid rerun unit 24, wherein a portion thereof is introduced via conduit 46 to the upper zone of the unit 24 as liquid reflux and the remainder thereof is passed via heater 48, to vaporize and heat the isobutane, and conduit 50 to the lower zone of the unit 24 to heat same.

Heater 48 raises the temperature of the isobutane stream to about 325° F.

Eductor 26 is utilized in conduit 20 to provide acid to rerun unit 24. A portion of the high pressure recycle liquid isobutane removed via conduit 42 from fractionation unit 34 and which is passed via conduit 52 as recycle to conduit 10 is removed via conduit 54 and passed to eductor 26 whereby it serves to actuate the eductor 26 to charge the liquid HF catalyst to regeneration via heater 28.

The volume ratio of liquid isobutane to acid in eductor 26 is ordinarily in the range of 0.8:1 to 30:1 and preferably in the range of 1:1.

Heater 28 is normally operated at a temperature in the range of 100° F. at the inlet to 300° F. at the outlet butane in conduit 44 by heat exhanger 48 which isobutane vapor effluent is maintained at a temperature in the range of 300 to 325° F. to produce vaporous isobutane for reboiling the rerun unit and as stripping fluid for the unit.

The eductor 26 is made with a Monel metal throat and is referred to in the trade as a Monel trim eductor. The Monel metal resists erosion at this point of high velocity on the part of the liquid better than does steel. The eductor will preferably utilize a 1:1 ratio of liquid hydrocarbon and liquid HF. Although as previously indicated, ratios outside this range can be used.

When using a conventional pump to charge used HF catalyst (contains water and acid soluble oils) to the rerun unit by way of preheater 28, it is necessary to heat the stream to about 300° F. in order to vaporize the HF therein. This results in pump problems and also in rapid corrosion of heat exchange 28. When using high pressure liquid isobutane 54 (about 250 p.s.i.a.) to power the eductor 26 to charge spent HF acid, there are no problems in the eductor, and the isobutane assists in vaporizing the HF, requiring only heating to about 270° F. in the heat exchange 28 with very considerably less corrosion thereof.

In addition, by operating the alkylation process in accordance with the present invention there is achieved a reduction in the total flow of isoparaffin (isobutane) required to reboil and to reflux column 24.

The following tabulations set forth specific operating conditions which further illustrate the present invention. Table I is a material balance of the specific flow rates and compositions in barrels per day. Table II sets forth operating conditions utilizing the flow rates of Table I.

TABLE I.—SPECIFIC FLOW, BARRELS PER DAY

| Stream component | Fresh feed (10) | Recycle iC₄ (52) | Hydrocarbon effluent (30) | Isobutane (40) | HF acid to isobutane to— | | | | Rerun overhead (56) | Sidedraw (38) | Alkylate (62) |
| | | | | | Rerun (20) | Eductor (54) | To reflux (46) | To reboil (50) | | | |
|---|---|---|---|---|---|---|---|---|---|---|---|
| Ethane | 5 | 2 | 8 | 2 | | | | | | | |
| Propylene | 244 | | | | | | | | | | |
| Propane | 446 | 629 | 1,123 | 641 | 1 | 3 | 1 | 1 | 6 | | |
| Isobutane | 762 | 10,372 | 10,604 | 10,572 | 2 | 45 | 23 | 23 | 93 | 23 | 1 |
| Butylenes | 342 | | | | | | | | | | |
| Normal butane | 490 | 2,509 | 3,048 | 2,558 | | 11 | 6 | 6 | 23 | 439 | 51 |
| Petane plus | 162 | 172 | | | | | | | | | |
| Alkylate | | | 1,376 | 176 | | 1 | | | 1 | 95 | 1,105 |
| Subtotal | 2,451 | 13,684 | 16,159 | 13,949 | 3 | 60 | 30 | 30 | 123 | | 1,157 |
| Acid soluble oils | | | | | 2 | | | | 1 | | |
| Water | | | | | 1 | | | | Trace | | |
| HF catalyst | | 1 | 94 | 1 | 54 | | | | 54 | | |
| Total | 2,451 | 13,685 | 16,253 | ¹13,950 | 60 | 60 | 30 | 30 | 178 | 557 | 1,157 |

¹ Includes flush for pump 32, not shown on drawing.

(charge to rerun). However, by having isobutane present in the HF stream going to the heater the heater temperature can be lowered to a temperature in the range of 100° F. at the inlet to 270° F. at the outlet (feed to rerun), thereby reducing heater corrosion because of this lower temperature.

The vaporous and liquid mixture is passed from heater 28 to an intermediate region of acid regeneration (rerun) zone 24. The temperature of the heated mixture passed to the rerun column 24 via conduit 54 is preferably in the range of 260 to 280° F.

Within rerun column 24, hydrogen fluoride and isobutane are separated from the acid-soluble oils and water and are withdrawn from rerun column 24 via conduit 56 and returned to the alkylation zone, e.g., are passed to acid settler 16. The acid-soluble oils and water are withdrawn from rerun column 24 via conduit means 58. Liquid isobutane from conduit 46 serves to aid in the separation of the hydrogen fluoride from the impurities. The bottom temperature and pressure of the rerun column 24 is maintained in the range of 290 to 310° F. and 125 to 175 p.s.i.g., respectively. The method of heating rerun column 24 comprises heating a portion of the iso-

TABLE II

Operating conditions:
    Reactor (14):
        Temperature, ° F. _____ 100
        Pressure, p.s.i.a. _____ 125
    Settler (16):
        Temperature, ° F. _____ 110
        Pressure, p.s.i.a. _____ 115
    Rerun column (24):
        Top temperature, ° F. _____ 250
        Bottom temperature, ° F. _____ 300
        Pressure, p.s.i.a. _____ 150
    Fractionator (34):
        Top temperature, ° F. _____ 130
        Bottom temperature, ° F. _____ 420
        Pressure, p.s.i.a.:
            Top _____ 300
            Bottom _____ 310

Reasonable variations and modifications of this invention can be made, or followed, in view of the foregoing disclosure, without departing from the spirit or scope thereof.

I claim:
1. In an alkylation process which comprises contacting a low-boiling isoparaffin with a low-boiling olefin and hydrogen fluoride acid catalyst in an alkylation zone, passing an effluent from said alkylation zone to a separation zone, withdrawing a hydrocarbon phase from said separation zone, passing said hydrocarbon phase to a fractionation zone, withdrawing a liquid low-boiling isoparaffin from said fractionation zone, passing at least a portion of said low-boiling isoparaffin from said fractionation zone to said alkylation zone, withdrawing alkylate from said fractionation zone, withdrawing a liquid phase from said separation zone and passing at least a portion of said acid phase to a regeneration zone the improvement which comprises utilizing a portion of said liquid low-boiling isoparaffin to actuate an eductor means which charges said acid phase to said regeneration zone.

2. A process according to claim 1 wherein said low-boiling isoparaffin is isobutane and said low-boiling olefin comprises propylene and butylenes.

3. A process according to claim 1 wherein the liquid volume ratio of said low-boiling isoparaffin to said acid phase is in the range of 0.8:1 to 30:1.

4. A process according to claim 1 wherein said low-boiling isoparaffin is obtained from said fractionation zone.

References Cited
UNITED STATES PATENTS

| | | | |
|---|---|---|---|
| 2,400,386 | 5/1946 | Bolinger et al. | 260—683.48 |
| 2,905,735 | 9/1959 | Van Pool | 260—683.4 |
| 3,171,865 | 3/1965 | Davison et al. | 260—683.48 |
| 3,410,759 | 11/1968 | Fontenot et al. | 260—683.48 |

DELBERT E. GANTZ, Primary Examiner

G. J. CRASANAKIS, Assistant Examiner